US008055465B2

(12) United States Patent  (10) Patent No.: US 8,055,465 B2
Dorneich et al.  (45) Date of Patent: *Nov. 8, 2011

(54) METHOD, DATA PROCESSING PROGRAM AND COMPUTER PROGRAM PRODUCT FOR DETERMINING A PERIODIC CYCLE OF TIME SERIES DATA

(75) Inventors: Ansgar Dorneich, Holzgerlingen (DE); Maik Goergens, Jena (DE); Andrzej Toroj, Warszawa (PL)

(73) Assignee: International Business Machines Corporation, Armonk, NY (US)

( * ) Notice: Subject to any disclaimer, the term of this patent is extended or adjusted under 35 U.S.C. 154(b) by 208 days.

This patent is subject to a terminal disclaimer.

(21) Appl. No.: 12/119,997

(22) Filed: May 13, 2008

(65) Prior Publication Data

US 2009/0017758 A1    Jan. 15, 2009

(30) Foreign Application Priority Data

Jul. 9, 2007 (EP) .................................. 07112038

(51) Int. Cl.
 *G01R 23/16* (2006.01)
(52) U.S. Cl. ......................................................... 702/76
(58) Field of Classification Search .................. 702/69, 702/75–77, 79, 176–178, 182, 183, 185, 702/189–191, 197
See application file for complete search history.

(56) References Cited

U.S. PATENT DOCUMENTS

| 6,914,963 B2 * | 7/2005 | Peoples ....................... 379/22.03 |
| 2004/0122950 A1 | 6/2004 | Morgan et al. |
| 2007/0179753 A1 | 8/2007 | Barajas et al. |

OTHER PUBLICATIONS

Gardner, E. S., Jr.; "Exponential Smoothing: The State of the Art—Part II," Jun. 3, 2005; Retrieved Mar. 31, 2008 from www.bauer.uh.edu/gardner/Exponential%20Smoothing.pdf.
Tashman, L.J., Kruk J.M.; "The Use of Protocols to Select Exponential Smoothing Procedures: A Reconsideration of Forecasting Competitions," International Journal of Forecasting, No. 12, pp. 235-253, 1996.
Taylor, J.W.; "Exponential Smoothing With a Damped Multiplicative Trend," International Journal Forecasting, No. 19, pp. 715-725, 2003.
Shah, C.; "Model Selection in Univariate Time Series Forecasting Using Discriminant Analysis," International Journal of Forecasting, No. 13, pp. 489-500, 1997.
Meade, N.; "Evidence for the Selection of Forecasting Methods," Journal of Forecasting, No. 19, pp. 515-535, 2000.
Hyndman, R.J., Wheelwright S.C., Makridakis S., Forecasting: Methods and Applications, 3rd ed., 1998, John Wiley & Sons, New York, pp. 147-178.
Duhamel, P. and M. Vetterli, Fast Fourier Transforms: A Tutorial Review and a State of the Art, Signal Processing 19 (1990), 259-299, Elsevier.
Gardner, E.S. Jr., McKenzie, Ed. "Model identification in exponential smoothing." Journal of the Operational Research Society, 1988, No. 39, pp. 863-867.
Office Action for U.S. Appl. No. 12/119,900 dated Feb. 4, 2011.

* cited by examiner

*Primary Examiner* — Mohamed Charioui
(74) *Attorney, Agent, or Firm* — Mollborn Patents, Inc.; Fredrik Mollborn (57) ABSTRACT

Method, apparatus, and system, including computer program products, implementing and using techniques for determining a periodic cycle of time series data. A frequency spectrum of the data is provided. The frequency spectrum is processed using at least one of the following steps, resulting in a processed frequency spectrum: filtering the frequency spectrum for reducing noise of the data, truncating the frequency spectrum at low frequencies, and weighting high frequency contributions over low frequency contributions of the frequency spectrum. A periodic cycle is extracted based on the processed frequency spectrum.

11 Claims, 8 Drawing Sheets

METHOD, DATA PROCESSING PROGRAM AND COMPUTER PROGRAM PRODUCT FOR DETERMINING A PERIODIC CYCLE OF TIME SERIES DATA

CROSS-REFERENCE TO RELATED APPLICATIONS

The present application claims benefit under 35 U.S.C. §119 of European Application No. EP07112038, filed Jul. 9, 2007, which is hereby incorporated herein in its entirety.

The present application is related to co-pending U.S. patent application Ser. No. 12/119,900, entitled "METHOD, DATA PROCESSING PROGRAM AND COMPUTER PROGRAM PRODUCT FOR TIME SERIES ANALYSIS", which is filed on even day herewith and assigned to the assignee of the present application.

BACKGROUND

The invention relates to time series analysis, and in particular to determining a periodic cycle of time series data. Apart from identification and estimation of a stable and accurate model, time series modeling consists of calculating some periodic cycles or seasonality patterns which are comprised in the time series data. For such analyses it is known in the art to use additional seasonally-lagged regressors in an equation (seasonal autoregressive integrated moving average (ARIMA) models), introducing additional dummy variables into some trend equation before the (non-)linear estimation of its coefficients, or iterative correction of the forecasted value with respect to its recent seasonal counterpart (exponential smoothing).

In seasonal data, there is a cyclical data pattern. For example, quarterly gross domestic product (GDP) data are characterized by some decline in the winter quarter (with less activity in construction and agriculture sector), and some decline as summer holiday effect. It can be expected a cycle of four observations, on top of an upward-sloping trend and variable-length business cycle. Monthly unemployment data are characterized by a cycle of twelve, with some activity decline in the winter and school graduates entering the labor market in the summer. Heaviness of traffic is possibly to be determined by three cycles, e.g. daily: rush hours and night, weekly: no rush hours on the week-end and annual: long week-ends, national holidays, summer holidays etc. The exact cycle lengths depend here on time intervals of measurement.

A problem may arise when this cycle length is not known (or not so obvious) in advance. Another question is whether the seasonality of the data is significant at all. If not, introducing seasonal parameters into the model could account for over fitting the data. The time series analysis methods developed as part of e.g. Intelligent Miner time series functionality do support versions both with and without seasonality, but it is still needed to decide whether to use it and what the cycle length is.

State of the art time series analysis software, e.g. SPSS, Statistica, Eviews, Stata and the like, normally requires seasonality cycle length, e.g., twelve for monthly data, as an input parameter. Besides, the user is often asked whether his data are quarterly, monthly etc. and the program sets then the parameter to four, twelve, etc., respectively. Other programs also provide tools graphically supporting an expert user when taking decision as to seasonality length.

SUMMARY OF THE INVENTION

In one aspect, the invention provides method, apparatus, and system, including computer program products, implementing and using techniques for determining a periodic cycle of time series data. A frequency spectrum of the data is provided. The frequency spectrum is processed using at least one of the following steps, resulting in a processed frequency spectrum: filtering the frequency spectrum for reducing noise of the data, truncating the frequency spectrum at low frequencies, and weighting high frequency contributions over low frequency contributions of the frequency spectrum. A periodic cycle is extracted based on the processed frequency spectrum.

In the drawings, like elements are referred to with like reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

According to various embodiment of the invention, methods for determining a periodic cycle of time series data are proposed. One method includes providing a frequency spectrum of the data. At least one of the steps of filtering the frequency spectrum for reducing noise of the data; truncating the frequency spectrum at low frequencies; weighting high frequency contributions over low frequency contributions of the frequency spectrum is performed.

The approach according to one embodiment of the invention is based on the Fast Fourier Transform (FFT) procedure, summarized in many publications, e.g. described by J. Stoer in Numerische Mathematik 1, Springer-Verlag, Berlin Heidelberg 1993; or by B. Harris in Spectral analysis of time series, John Wiley & Sons, New York 1967. The Fourier transform $F_k$ is $$F_k = \sum_{t=0}^{T-1} Y_t \cdot e^{\frac{2\pi i}{T} \cdot tk}$$

with Y(t) is denoting the original time series, time t=0, ..., T-1, k=0, ..., T-1. Unless T equals a power of 2, the time series is zero-filled at the end so that this condition is fulfilled. Further, this F(k) output is processed until a periodicity (as number of observations per cycle) and its relative weight (among other periodicities) are finally found.

This FFT-based spectral analysis is combined with a new method for detecting separate distinct periodic cycles or seasonalities, each of them being a composition of a basic frequency and its harmonics.

Both input and output of the FFT are complex numbers. As all time series considered here are real numbers, the real part (real) of the input equals the observed value of time series and the imaginary part (imag) of the input is always 0. The output is summarized into a real number again by calculating the absolute value of the complex numbers and scaled according to time t, yielding a standard periodogram. $P_k$ is:

$$P_k = \frac{\sqrt{\text{real}(F_k)^2 + \text{imag}(F_k)^2}}{T/2}$$

With $F_k$ the Fourier transform and T the time, where the k-th observation is associated with frequency k/T, and, consequently, periodicity T/k. For example, the 17-th output observation, in a (zero-filled) series of 64 represents a frequency of 16/64=0.25, and a periodicity of 64/16=4. A relatively high value could suggest quarterly data, a low value that it has not been fitted to any sinusoidal function of wavelength 4. This standard FFT output is then processed in the manner described hereafter.

Advantageously, before processing by FFT, an ordinary least squares fit of the equation Y(t)=a+bt+e(t) is performed on the input time series data and the e(t) series (deviations from a straight line) is further considered. This removes long-term trend from data before the Fourier transformation which helps to reduce the weight of the spectral peak at frequency 0 and infinite periodicity. By removing a constant and a linear trend, the Fourier coefficient P(0) is reduced to zero, which is desirable, as most business or economic time series are trending, sometimes also in a long term. Trending is even more probable when the sample is short. Not only is an irrelevant peak appearing at frequency 0 eliminated, but also its die-out effects at frequencies 1/T, 2/T, 3/T, etc. are reduced. Without that reduction, and with a strong trend, these die-out effects can strongly outweight the relevant peaks of seasonality, rendering them invisible. Consequently and favorably, the coefficient P(0) is not taken into consideration any more.

Figure 1A:
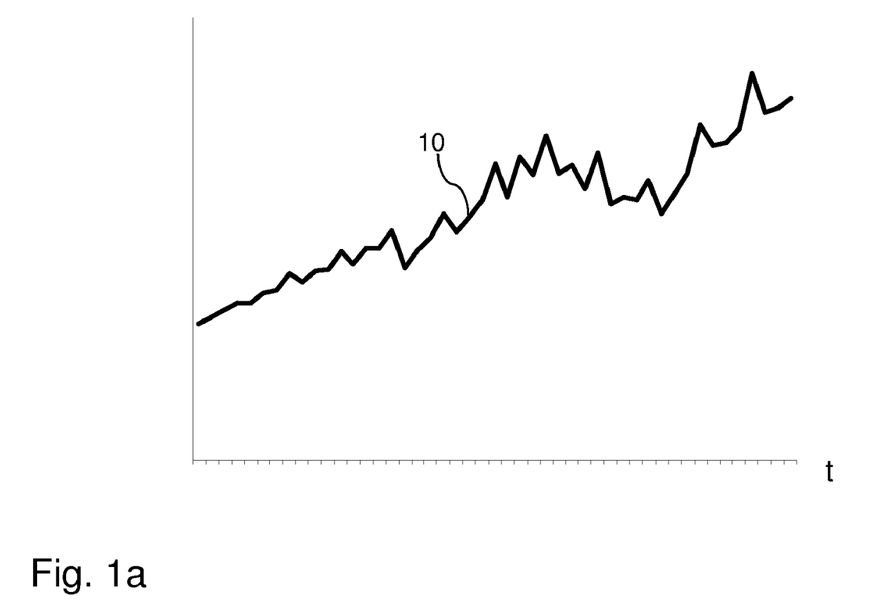
FIG. 1a an original time series representing quarterly trending GDP data used as an example for demonstration of a method in accordance with one embodiment.
Figure 1B:
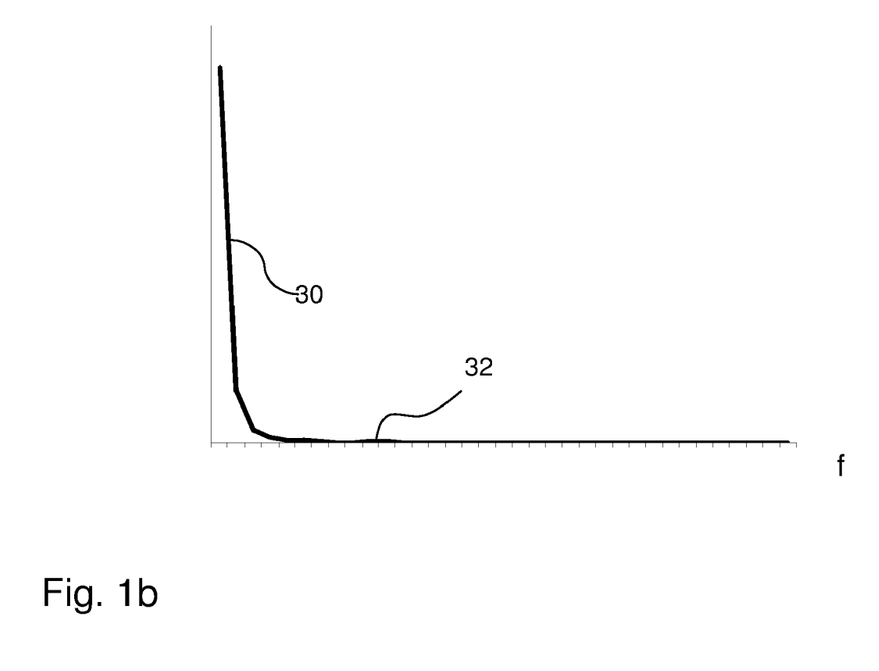
FIG. 1b a Fast Fourier Transform (FFT) output of the time series data of FIG. 1a in accordance with one embodiment; the input is left not detrended.
Figure 1C:
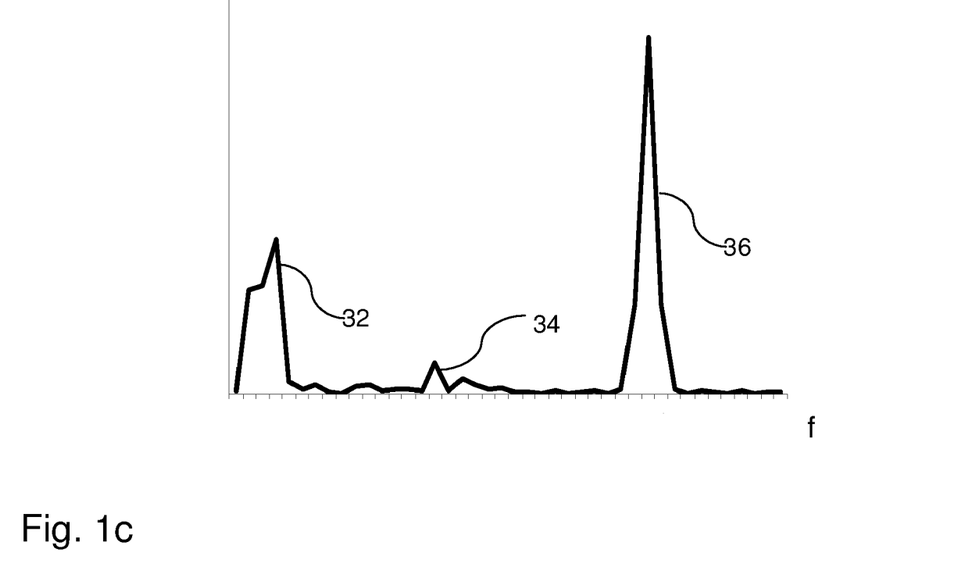
FIG. 1c an FFT-output of the time series data of FIG. 1a in accordance with one embodiment; the input is now detrended, peaks at frequencies $2f$ and $4f$ are visible.

FIG. 1a shows an original time series data 10 representing by way of example a quarterly trending GDP (gross domestic product) data as function of time t, used as an example for demonstration of the method in accordance with one embodiment. The curve increases in time and exhibits some structure superimposed on the increasing curve. Next FIG. 1b represents the FFT processed data as a function of the frequency f, without any detrending process, thus exhibiting a very strong peak 30 at low frequency and a small peak at a higher frequency. Referring now to FIG. 1c the advantage of the detrending process with the least squares fit is demonstrated where the possible long term trend represented by peak 30 (FIG. 1b) is completely removed. Thus peak 32 is clearly visible and additional peaks 34, 36 can be seen at still higher frequencies f.

Figure 2:
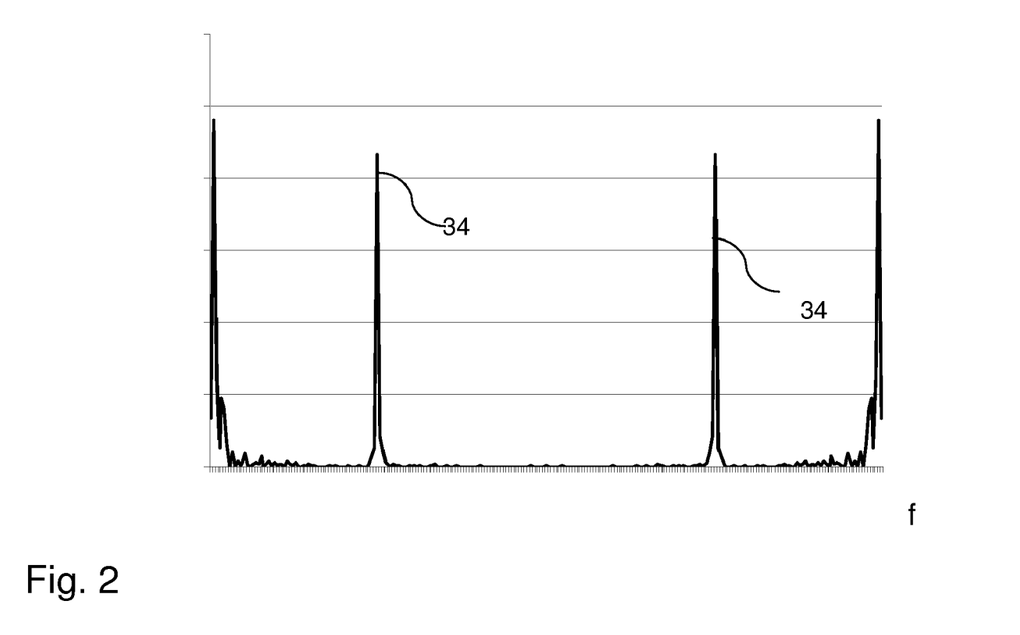
FIG. 2 an entire FFT-output showing that the upper half of the frequency spectrum is just a reflected copy of the lower half and need not be taken into account in accordance with one embodiment.

Frequencies higher than f=0.5 correspond to periodicities 1/f lower than 2. As the method is preferably based on integer periodicity 1/f, 2 is the lowest candidate possible. This is the reason why preferably only approximately half of the remaining P(k) coefficients are taken into account, i.e. they start at k=1 and end at the first local minimum after the middle value. This choice of the end point reflects the fact that also 1/f=2 is considered as a candidate and its relative weight should not be underestimated if it really should be a significant periodicity. A mathematical justification for stopping at half the maximum frequency is the fact that the Fourier Transform X(f) of a real-valued time series x(t) has an even real part, Re(X(-f))=Re(X(f)), and an odd imaginary part, Im(X(-f))=-Im(X(f)), hence the absolute value $\sqrt{(\text{Re}^2+\text{Im}^2)}$ is an even function with period T, and therefore the second half of the frequency spectrum is just a reflected copy of the first part. This fact is demonstrated in FIG. 2 showing the whole frequency spectrum with peak 32 over periodicity 1/f.

The following steps in accordance with one embodiment serve to separate the desired significant frequency peaks from the noise in the FFT spectrum, which arise from several sources: noise in the original data, noise introduced by non-perfect detrending and by the finite sampling length.

According to one embodiment the remaining values are filtered by means of so called Bartlett weights. Let N denote the width of weighting window, N is odd and has its peak in the middle. Let j=0, ..., N-1 denote the distance from the middle of the window which is symmetric. The weights $w_j$ are then defined as $$w_j = \frac{\frac{N+1}{2} - j - 1}{\left(\frac{N+1}{2} - 1\right)^2}$$

A parameter for N of N=19 is chosen advantageously. The value of N is an empirical value achieved by tests performed for various data sets considering climate data, weather data, economical data etc. Thus noise can be filtered out from the periodogram. As further processing is based on partitioning the periodogram with respect to its monotony, significant minimum and maximum points have to be found. Also, a very high peak is distributed within the window width, forming a clearly separatable partition of high-weighted frequencies.

Figure 3:
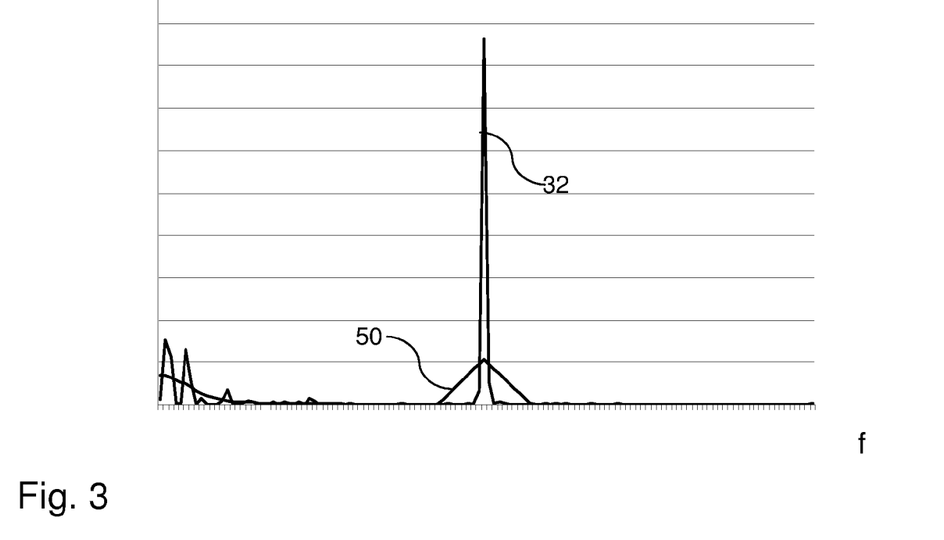
FIG. 3 an unfiltered and a filtered periodogram after the application of Bartlett weights in accordance with one embodiment.

The effect of the described filtering process can be seen in FIG. 3, where the filtered curve 50 is shown. The abscissa in FIG. 3 is the frequency f which represents the reciprocal value of the periodicity 1/f. The spectrum is thus smoothed and closely neighbored tiny peaks are merged.

Figure 4:
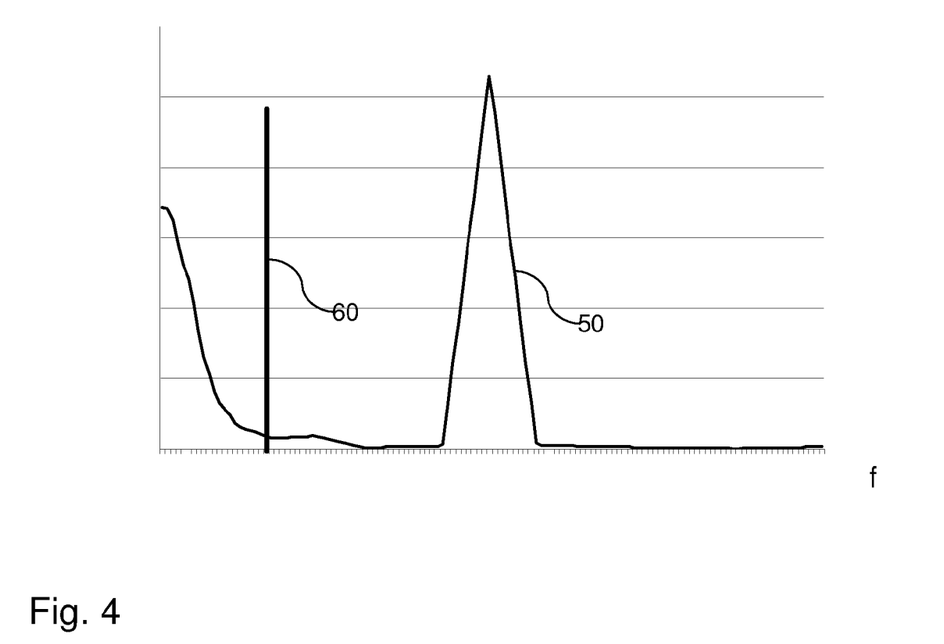
FIG. 4 a truncation of the low frequency border of the periodogram in accordance with one embodiment.

As another feature of one embodiment, the low-frequency border of the periodogram is truncated the low-frequency border is downward-sloping towards higher frequencies; this is due to unremoved non-linearity in trend or stochastic long-term trends, which can produce an effect of very long "seasonal" waves occurring. The first local minimum is the left-border of the periodogram analyzed. The truncation of the low frequency border is shown in FIG. 4 by the truncation limit 60. Thus the effects of finite sampling length and non-perfect detrending are eliminated.

The following step of one embodiment, another means for dampening the influence of finite sampling length and non-perfect detrending, covers the weighting of the values at every frequency: letting P(i) denote i-th value of the periodogram before truncating, i=1, 2, . . . , the new values P(i)* equal:

$$P_i^* = P_i \cdot (1 - e^{-ci}) \text{ with } c = \frac{\log(1 - 0.8)}{1 - \frac{T}{2}}$$

(T=periodogram size before truncating).

The impact of the weighting is regulated by the constant c. Advantageously, the constant c is chosen such that c<~1/N is fulfilled. With the specification above, the weight in the middle of the periodogram before left-truncating (T/2) is reaching 80% (0.8).

These weights vary from 0 to 1, converging asymptotically towards 1 from the lower to the higher frequencies. This reflects the relation of the sample-size and the possible seasonal wave. Obviously, a short time series containing only 2 or 3 full cycles is very prone to misspecification of the seasonality. On the other side, as it is not known how many cycles the sample contains so the low-frequency end (before truncating) starts at one cycle, including all the possibilities. The longer the seasonal wave assumed, the greater the requirements for the length of the sample and the "shorter" the same series becomes from subjective point of view of an empirical researcher. These weights reduce the periodogram values according to this subjective "shortness" of the time series, reducing the possible short-sample bias effects for the low frequencies and leaving the high frequencies almost unchanged.

Figure 5:
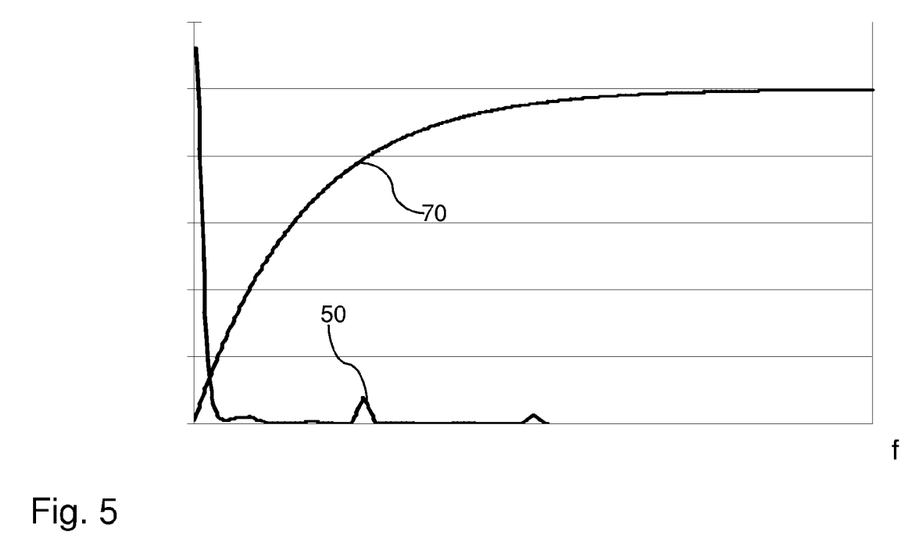
FIG. 5 an unweighted periodogram and weight function applied for weighting the frequency output in accordance with one embodiment.
Figure 6:
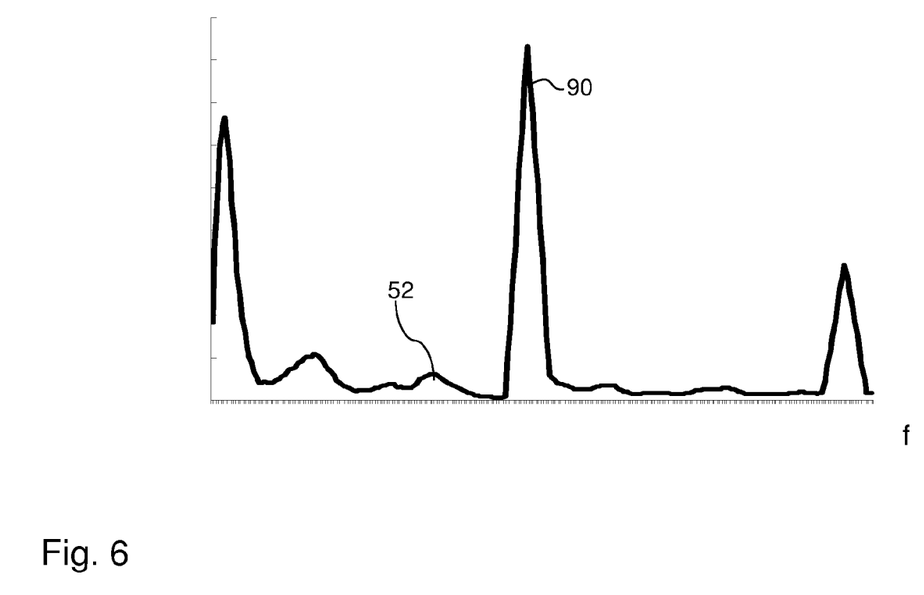
FIG. 6 a weighted periodogram in accordance with one embodiment.

FIG. 5 shows the unweighted periodogram 50 and the weight function 70 applied for weighting the frequency output whereas in FIG. 6 shows the weighted periodogram 52. The weight function starts with a steep increase from zero and becomes a constant at higher frequencies similar to a function $1-e^{-cx}$. The constant c, i.e. the slope near zero point, correlates with N, as mentioned above and should be sufficiently small to extensively eliminate a remaining intensity from the peak near zero.

The last two steps in accordance with one embodiment, namely truncating at low frequencies and weighting the periodogram serve, in general, the same purpose: to eliminate the impact of accidental pattern recognition with longer waves. This is why the integer index of weighting, i, starts at the point which had already been cut off before. Thus the overall weight of a partition is reduced if there is an upswing in the periodogram at a very low frequency and the filtering was still not strong enough to prepare a monotonous downward-sloping origin to cut off before. On the other hand, the periodogram values should not be pulled down too strongly, as there can be some significant longer periodicity. This setting of the constant is therefore a suitable compromise between these two mutually exclusive objectives.

Figure 7:
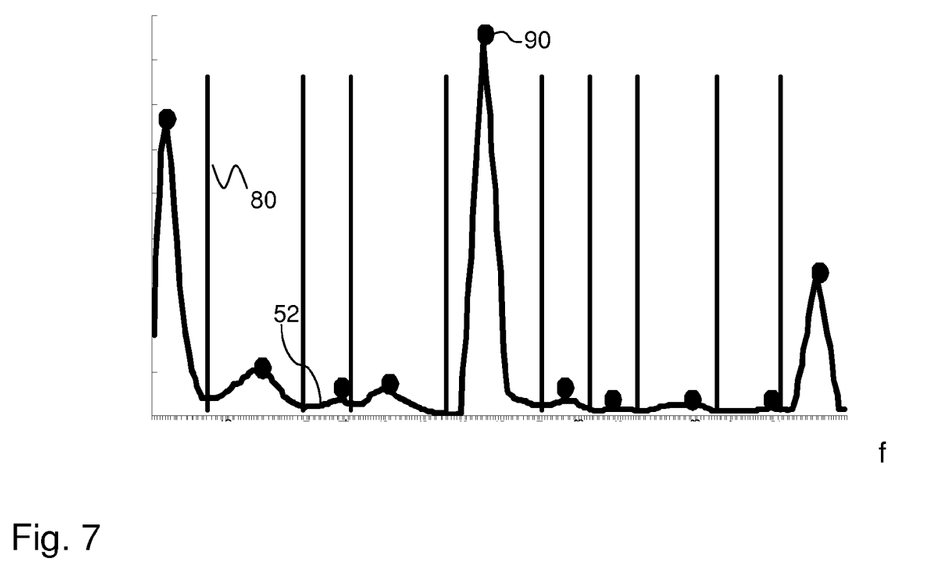
FIG. 7 a partitioning process of the transformed periodogram according to monotony of the different partitions in accordance with one embodiment.

In another embodiment of the invention the filtered, truncated and weightened periodogram is partitioned according to its monotony, which is demonstrated in FIG. 7. The borders between partitions 80 are local minima, and partition "centres"—local maxima 90.

Advantageously, neighboring partitions will be merged, starting with the partition centred about the global maximum. If the minimum on either border of the partition centered about the global maximum is no less than 30%, the two partitions are merged and the new centre is set to the higher of the two maxima. The nearest local minima outside the 30%-limit are set as the final border of a partition. This procedure is repeated then for the highest maximum of the ones that have not yet been processed, until every maximum is checked for this possibility.

Figure 8:
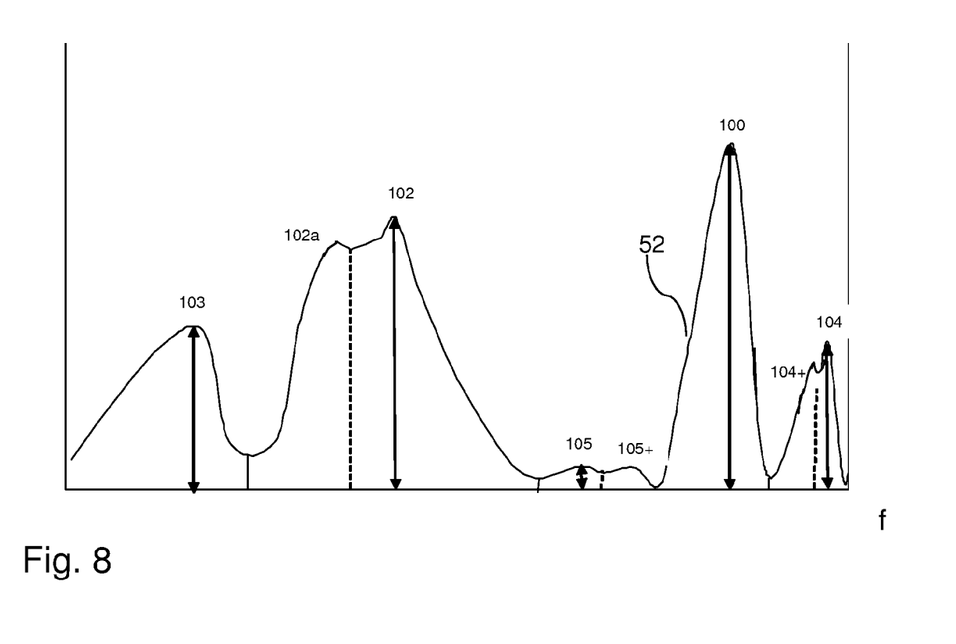
FIG. 8 a merging process of adjacent peaks of the periodogram in accordance with one embodiment.

First, local maxima and minima are found, as shown in FIG. 8. The start point will be the—the global maximum 100, and the neighboring minima are more than 30% lower, so these are final borders of the partition 100. Then, the start point will be at the second greatest value, that is, 102. The local minimum on the left of it is less than 30% lower than this local maximum, so the partition on the left 102+ is merged with partition 102. Third greatest value 102+ has already been used, so the fourth one is taken next to form partition 103, just like 100. Further, mergers are performed on 104, 104+ and 105, 105+.

Each partition 100 through 105+ is a potential seasonality wave. Preferably its relative weight is calculated as a sum of the (filtered and weighted) periodogram values divided by the sum of all periodogram values. The relative weights of the seasonalities all sum up to 100%. Each partition 100 through 105+ is then represented by one frequency value. This is calculated as weighted average of frequencies within the partition, with the ORIGINAL periodogram values (not weighted and not filtered) as weights. This improves the precision of the final representative frequency of a partition. Not all periodogram points of one partition are taken into account: the periodogram is truncated left and right at the local minima closest to the peak in the original periodogram. This is due to possible precision problems when the partition is asymmetric with respect to the maximum, in case of:

1. lower frequencies overlapped by unremoved long-term influences,
2. data with very clear seasonal pattern and little noise, containing no "random" maximum points in the neighbourhood of the true seasonality point, which extends the partition excessively to the right or to the left.

All partitions with weight less than 5% are deleted. They are assumed to be random and could cause problems in further processing. In FIG. 8, partitions 105 and 104 are likely to be deleted in this way.

Figure 9:
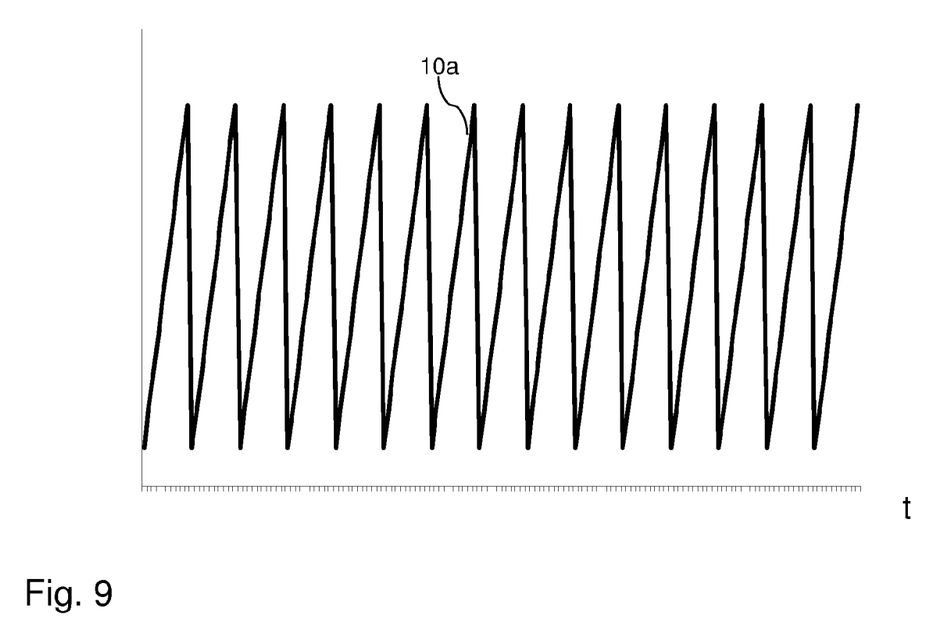
FIG. 9 an original time series as another example for the method in accordance with one embodiment; these data are representing a repeating upward sloping pattern, length of 10.
Figure 10:
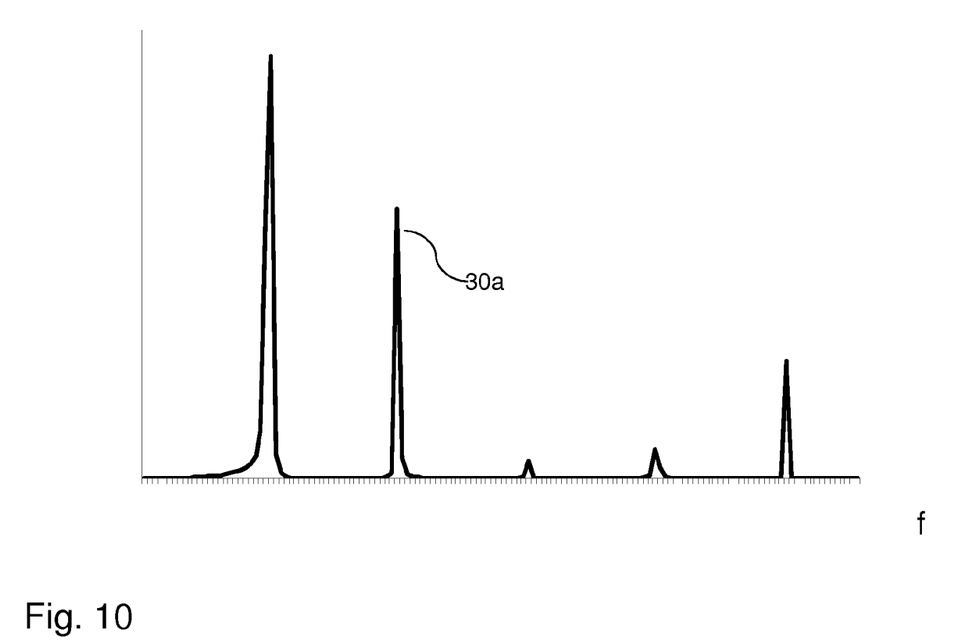
FIG. 10 an FFT-output of the time series data of FIG. 9 in accordance with one embodiment; results are peaks at periodicity $1/f=10$, $10/2$, $10/3$, $10/4$, $10/5$.

If there is a peak at frequency f, the peak is likely to appear also at 2*f, 3*f etc. Sometimes the peak at 2*f is even heavier than the one at 4*f with quarterly data. This is due to the exact pattern of seasonality (a sub-cycle of 2*f can be modelled with higher amplitude than the main one of 4*f) and to the fact that the FFT method reproduces the swings by means of sine and cosine functions and if the shape of a time series' seasonal pattern does not match them exactly, it uses multiples of the "true" frequency for fine-tuning. The extreme (theoretical) example is a sequence of slopes, which produces a peak at its relevant periodicity and die-out effects at shorter ones. FIGS. 9 and 10 show this effect (FIG. 9: original sequence of slopes of the time series data 10*a* as a function of time t, exhibiting a sawtooth-like behavior, FIG. 10: periodogram, namely the FFT output 30 as a function of frequency f). Such peaks can be understood as higher harmonics of the base oscillations. This is why regarding such peaks separately could be misleading.

The algorithm aggregates such multiples, adding the weights of higher frequencies to their respective lower ones (if any) and then deleting the higher ones. Removing the seasonality partitions with weight less than 5% prevents a random low-frequency partition of periodogram from becoming a base for such aggregation. Each of the calculated periodicities (inverses of partitions' representative frequency; ordered by the weight derived from the periodogram) is examined to determine whether it is located in the neighbourhood (+/−0.2) of an integer number (which is a condition for this periodicity to be the true one). If so, the algorithm is searching for a partition with representative frequency in the neighbourhood (+/−0.02, with frequency between 0 and 1) of a double, triple, and so on, of the frequency of the partition examined and, once the partition is found, performs the merger.

From the point of view of the methods supported (ARIMA, exponential smoothing, seasonal-trend decomposition) a choice of longer periodicity (in case of encompassing ones) makes it possible to model both without loss of information. Seasonal-trend decomposition supports modelling of multiple interfering seasonality cycles (provided the time series is sufficiently long), but using single longer seasonality—in case of encompassing periodicity lengths—is also preferable, if the series is long enough.

In a further embodiment of the invention another step is to decide whether the seasonality calculated should be applied at all or if this pattern is so weak that an introduction of a seasonal model would lead to overparametrisation. One hint is the weight of the greatest periodicity partition. The lower the weight, the higher is the probability of a random peak (relatively balanced distribution of weight among partitions). However, this can also be misleading when the impact of filtering is high. A more formal criterion is the ratio S:

$$S = \frac{\sum_{i=L}^{R} W_i}{\sum_{all} W_i}$$

with W(i)=original periodogram values, not filtered, but weighted using the general weight function described; L=left and R=right border of weighted average calculation. This ratio is calculated for every partition. If the highest one is above 0.2, seasonality is assumed. Otherwise, seasonality is not assumed; this is conclusion from empirical tests, in which series with no seasonal behavior take values of 0-0.15, and one with clear seasonal behavior—above 0.5 at this place.

Figure 11:
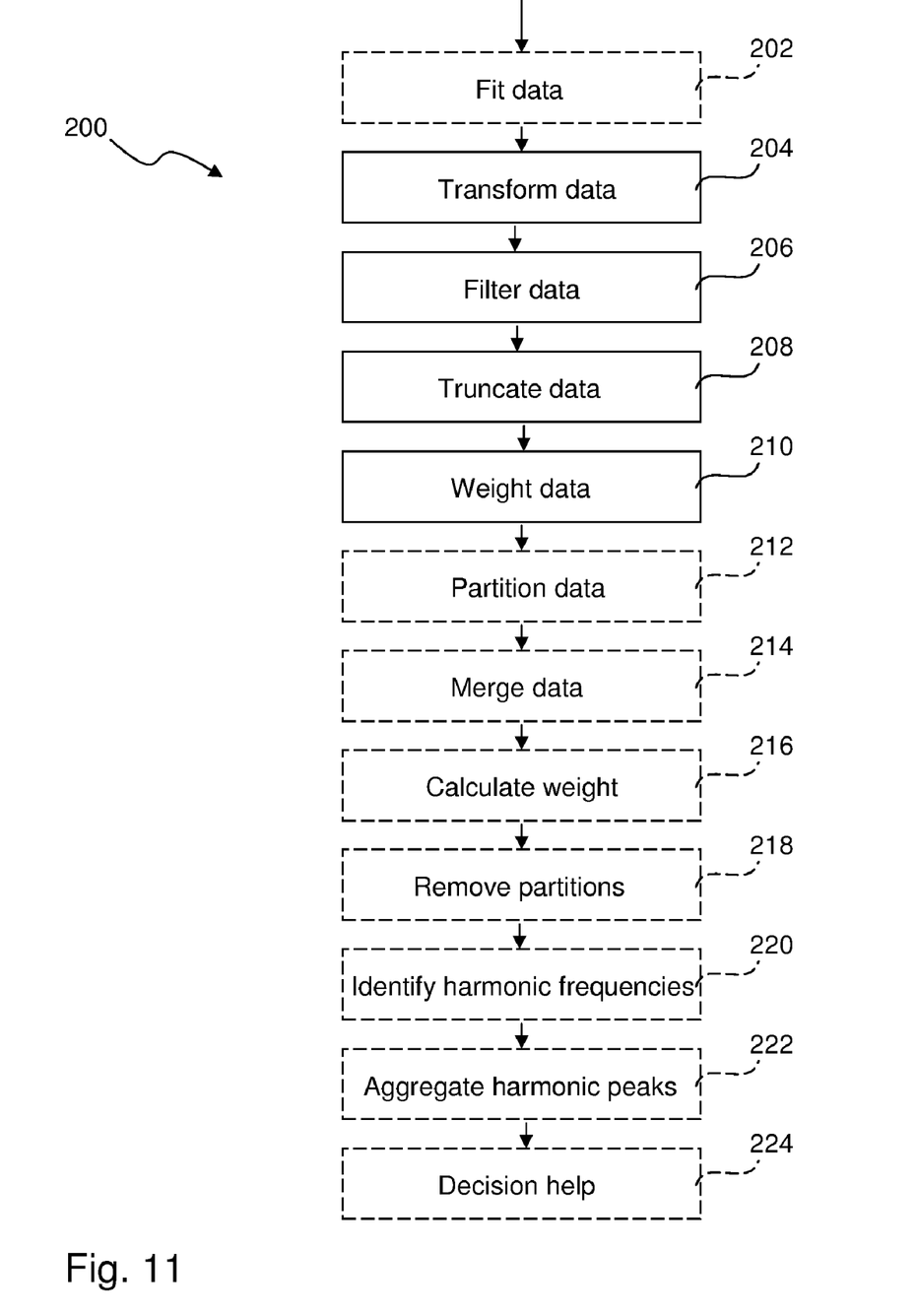
FIG. 11 a flowchart of data processing steps for performing a method in accordance with one embodiment.

In FIG. 11 an overall flowchart 200 of the data processing steps involved in performing a method in accordance with one embodiment of the invention.

Time series data are entered and optionally fitted with a least squares fit in first step 202. The least square fit favorably eliminates long term trends in the data.

Then in the main step 204 a Fast Fourier Transformation of the time series data will be performed.

Next, data are filtered in step 206 in order to separate the desired significant frequency peaks from the noise in the FFT spectrum.

Additionally the FFT data are truncated at low frequencies in step 208 in order to remove non-linearity in trend or stochastic long-term trends.

The next step 210 is weighting high frequency contributions over low frequency contributions of the frequency spectrum in order to eliminate the impact of accidental pattern recognition with longer waves.

In an optional additional step 212 the processed FFT spectrum is partitioned according to local minima or maxima.

Optionally, neighboring partitions are merged in optional step 214 in order to magnify main seasonal cycles in the data.

Further, in optional step 216 relative weights for the partitions may be calculated.

In optional step 218 partitions with too low weight are removed to concentrate the search on main seasonal cycles of the data.

In a further optional step 220 harmonic frequencies may be identified.

These harmonic peaks may optionally be aggregated in optionally step 222 in order to remove higher harmonics due to artificial effects of the base function.

Additional optional step 224 which covers a help to decide whether a found seasonality pattern is taken for real may be included in the whole data processing flow at the end.

Figure 12:
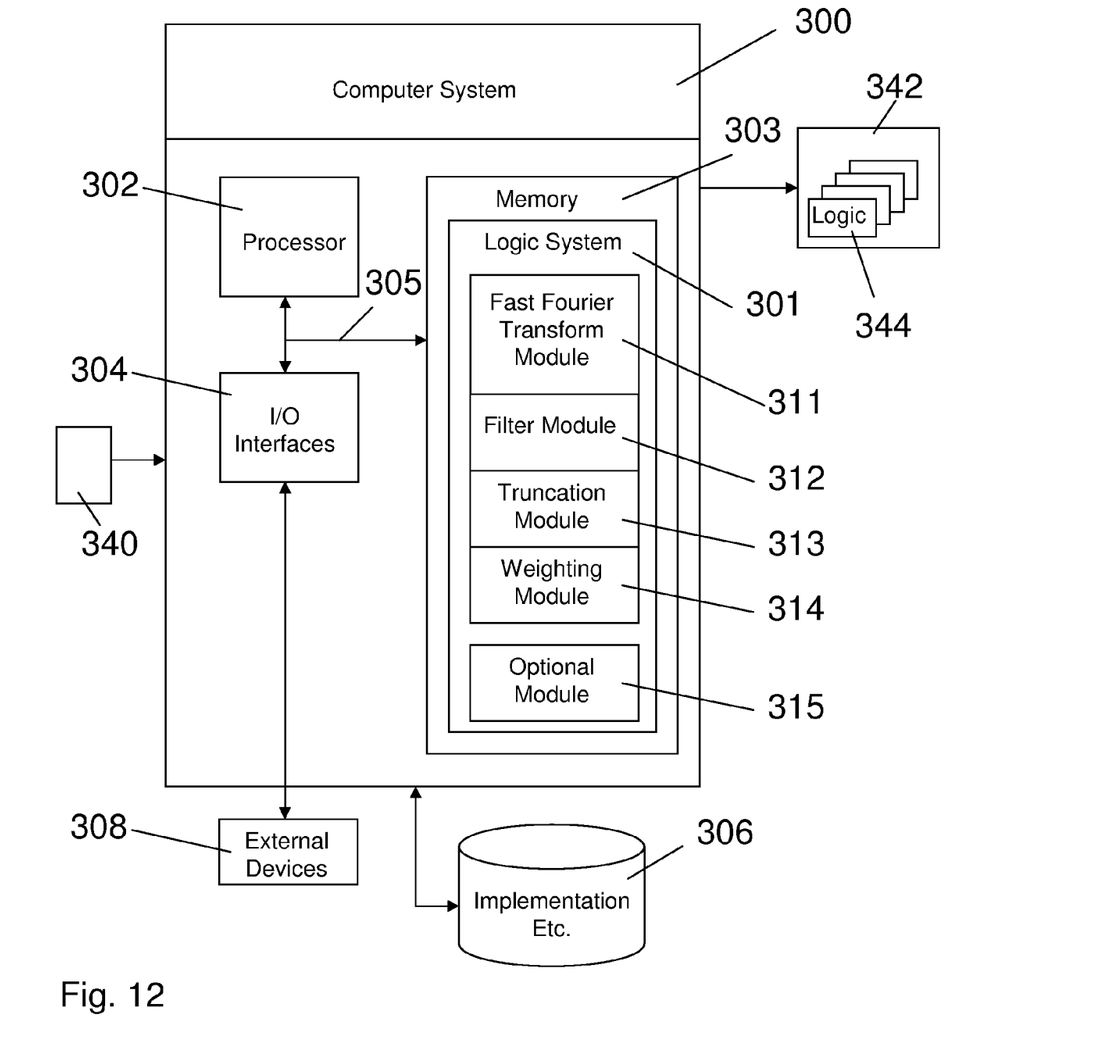
FIG. 12 a data processing system for performing a method in accordance with one embodiment.

FIG. 12 shows a computer system 300 implementation of the invention. Specifically, the invention can be implemented as a computer system 300 and/or program product 301 for conducting an analysis of a time series for detecting seasonality contained in the time series data. This allows a business user 340 to determine a seasonality without being an expert user. As depicted, computer system 300 generally comprises a processor subsystem 302, a memory 303, an input/output (I/O) interface 304, a bus subsystem 305, a database 306 as well as external devices 308.

Processor subsystem 302 encompasses the central processing unit (CPU) as well as any secondary processing devices, for example arithmetic processing unit, coupled to the CPU by the bus subsystem 305. Processor subsystem 302 may comprise a single processing unit, or be distributed across one or more processing units in one or more locations, e.g., on a client and server. Memory 303 may comprise any known type of data storage and/or transmission media, including magnetic media, optical media, random access memory (RAM), read-only memory (ROM), a data cache, a data object, etc. Moreover, memory 303 may reside at a single physical location, comprising one or more types of data storage, or be distributed across a plurality of physical systems in various forms.

I/O interface 304 may comprise any system for exchanging information from an external source. External devices 308 may comprise any known type of external device, including speakers, a CRT, LED screen, hand-held device, keyboard, mouse, voice recognition system, speech output system, printer, monitor, facsimile, pager, etc. Bus 305 provides a communication link between each of the components in the computer system 300 and likewise may comprise any known type of transmission link, including electrical, optical, wireless, etc. In addition, although not shown, additional components, such as cache memory, communication systems, system software, etc., may be incorporated into computer system 300.

Database 306 provides storage for information necessary to carry out the present invention. Such information could include time series data. Database 306 may include one or more storage devices, such as a magnetic disk drive or an optical disk drive. In another embodiment database 306 includes data distributed across, for example, a local area network (LAN), wide area network (WAN) or a storage area network (SAN) (not shown). Database 306 may also be configured in such a way that one of ordinary skill in the art may interpret it to include one or more storage devices. Moreover, it should be understood that database 306 could alternatively exist within computer system 300.

Stored in memory 303 is logic system 310. As depicted, logic system 310 generally includes a transformation module 311 for performing a Fast Fourier Transformation of the time series data, a filter module 312 in order to separate the desired significant frequency peaks from the noise in the FFT spectrum, a truncation module 313 for truncating the FFT data at low frequencies and a weighting module 314 for weighting high frequency contributions over low frequency contributions of the frequency spectrum in order to eliminate the impact of accidental pattern recognition with longer waves. The modules shown herein carry out the functions described above, yielding an output for output module 342.

Each of the software modules 311 through 314 is comprised of a set of instructions which are encoded in memory 303 as computer readable program code and executable by processor subsystem 302. Typically, the software modules 311 through 314 will be stored in auxiliary memory of memory subsystem 303 prior to the execution thereof. External device 308, e.g. a CD-ROM or file transfer software, is used to copy the modules 311 through 314 into the auxiliary memory of memory subsystem 303.

The functionality provided by the software modules 311 through 314 may be encoded in the memory 303 and/or in computer usable medium as discrete programs, each containing computer readable program code. Alternatively, the functionality provided by the software modules 311 through 314 may be encoded in the memory 303 and/or in computer usable medium as separate subroutines of a single computer program containing plural computer readable program subcodes. Furthermore, while any of the software modules 311 through 314 may be executed separately, typically the FFT module 311 will be initially executed by the processor 303, followed by filter module 312, truncation module 313 and weighting module 314.

Optionally additional modules for least squares fit of the time series data, partitioning the processed FFT spectrum according to local minima or maxima, merging neighboring partitions, calculating relative weights for the partitions, removing partitions with too low weight, identifying harmonic frequencies, aggregating harmonic peaks and deciding whether a found seasonality pattern is taken for real may be included in the logic system 301 and/or in the database 306.

Generally, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, embodiments of the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computer-implemented method for determining a periodic cycle of time series data, the method comprising:
   providing to a processor of a computer system a frequency spectrum of the time series data;
   processing by the processor of the computer system the frequency spectrum using the following steps, resulting in a processed frequency spectrum:
      filtering the frequency spectrum for reducing noise of the time series data,
      truncating the frequency spectrum at low frequencies, and
      weighting high frequency contributions over low frequency contributions of the frequency spectrum;
   partitioning by the processor the processed frequency spectrum according to local extrema;
   calculating by the processor relative weights for the partitions and removing partitions with relative weights under a limit; and
   extracting by the processor a periodic cycle of the time series data based on the partitioned processed frequency spectrum.

2. The method of claim 1, further comprising:
   using a least squares fit for processing the time series data before providing the frequency spectrum.

3. The method of claim 1, further comprising:
   processing only a part of the frequency spectrum.

4. The method of claim 1, further comprising:
   merging neighboring partitions of the processed frequency spectrum.

5. The method of claim 1, further comprising:
   identifying harmonic frequencies of the processed frequency spectrum and aggregating harmonic peaks of the processed frequency spectrum.

6. A non-transitory computer readable medium encoded with computer usable program code for determining a periodic cycle of time series data, the computer usable program code comprising:
   computer usable program code configured to provide a frequency spectrum of the time series data;
   computer usable program code configured to perform the following steps on the frequency spectrum, resulting in a processed frequency spectrum:
      filtering the frequency spectrum for reducing noise of the time series data,
      truncating the frequency spectrum at low frequencies, and
      weighting high frequency contributions over low frequency contributions of the frequency spectrum;
   computer usable program code configured to partition the processed frequency spectrum according to local extrema;
   computer usable program code configured to calculate relative weights for the partitions and removing partitions with relative weights under a limit; and
   computer usable program code configured to extract a periodic cycle of the time series based on the partitioned processed frequency spectrum.

7. The non-transitory computer readable medium of claim 6, further comprising:
 computer usable program code configured to use a least squares fit for processing the time series data before providing the frequency spectrum.

8. The non-transitory computer readable medium of claim 6, further comprising:
 computer usable program code configured to process only a part of the frequency spectrum.

9. The non-transitory computer readable medium of claim 6, further comprising:
 computer usable program code configured to merge neighboring partitions of the processed frequency spectrum.

10. The non-transitory computer readable medium of claim 6, further comprising:
 computer usable program code configured to identify harmonic frequencies of the processed frequency spectrum and aggregate harmonic peaks of the processed frequency spectrum.

11. A system for determining a periodic cycle of time series data, the system comprising:
 a processor, the processor executing a computer program comprising instructions for:
  providing a frequency spectrum of a time series data;
  processing the frequency spectrum, using the following steps, resulting in a processed frequency spectrum:
   filtering the frequency spectrum for reducing noise of the time series data,
   truncating the frequency spectrum at low frequencies, and
   weighting high frequency contributions over low frequency contributions of the frequency spectrum;
  partitioning the processed frequency spectrum according to local extrema;
  calculating relative weights for the partitions and removing partitions with relative weights under a limit; and
  extracting a periodic cycle of the time series data based on the partitioned processed frequency spectrum.

* * * * *